United States Patent
Pierce et al.

(10) Patent No.: US 11,422,672 B2
(45) Date of Patent: Aug. 23, 2022

(54) MANAGING UPDATES IN A COMPUTING SYSTEM USING MULTIPLE ACCESS METHODS

(71) Applicant: Samsung Electronics Co., Ltd., Gyeonggi-do (KR)

(72) Inventors: Jeffrey S. Pierce, Sunnyvale, CA (US); Mike Digman, Mountain View, CA (US); Ranhee Chung, San Francisco, CA (US)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 93 days.

(21) Appl. No.: 15/475,311

(22) Filed: Mar. 31, 2017

(65) Prior Publication Data
US 2017/0293414 A1     Oct. 12, 2017

Related U.S. Application Data

(60) Provisional application No. 62/320,917, filed on Apr. 11, 2016.

(51) Int. Cl.
*G06F 3/04817* (2022.01)
*G06F 9/451* (2018.01)
*G06F 3/0482* (2013.01)
*G06F 3/0488* (2022.01)

(52) U.S. Cl.
CPC ........ *G06F 3/04817* (2013.01); *G06F 3/0482* (2013.01); *G06F 3/0488* (2013.01); *G06F 9/451* (2018.02)

(58) Field of Classification Search
CPC .... G06F 3/0482; G06F 9/451; G06F 3/04817; G06F 3/0488; G06F 9/542; H04M 1/72552; H04L 51/24; H04L 51/26
See application file for complete search history.

(56) References Cited

U.S. PATENT DOCUMENTS

| | | | |
|---|---|---|---|
| 6,597,378 B1 * | 7/2003 | Shiraishi | G06F 3/0481 715/733 |
| 8,112,123 B2 | 2/2012 | Fujimoto | |
| 8,490,075 B2 | 7/2013 | Waris et al. | |
| 8,510,801 B2 | 8/2013 | Majmundar et al. | |

(Continued)

FOREIGN PATENT DOCUMENTS

| | | |
|---|---|---|
| KR | 20140137509 A | 12/2014 |
| WO | 2017179873 A1 | 10/2017 |

OTHER PUBLICATIONS

WIPO Appln. PCT/KR2017/003880, International Search Report and the Written Opinion, dated Jul. 18, 2017, 12 pg.

(Continued)

*Primary Examiner* — Matthew Ell
*Assistant Examiner* — David Tan
(74) *Attorney, Agent, or Firm* — Cuenot, Forsythe & Kim, LLC

(57) ABSTRACT

Managing updates can include receiving data items corresponding to available content for different applications, determining, using a processor, priorities associated with the data items, and creating updates for the data items using the priorities. The updates can be displayed in different ones of a plurality of views. Each view of the plurality of views is configured to display updates of a same priority.

20 Claims, 8 Drawing Sheets

(56) References Cited

U.S. PATENT DOCUMENTS

| | | | |
|---|---|---|---|
| 8,707,201 B1* | 4/2014 | Aradhye | G06Q 10/107 |
| | | | 715/789 |
| 9,049,259 B2 | 6/2015 | Rathod | |
| 9,137,701 B2 | 9/2015 | Raleigh et al. | |
| 9,360,991 B2 | 6/2016 | Celebisoy | |
| 9,787,485 B1* | 10/2017 | Yeskel | G06F 9/542 |
| 2003/0030670 A1* | 2/2003 | Duarte | G06Q 10/10 |
| | | | 715/758 |
| 2005/0120306 A1* | 6/2005 | Klassen | G06F 3/04817 |
| | | | 715/765 |
| 2006/0173614 A1 | 8/2006 | Nomura | |
| 2007/0180401 A1 | 8/2007 | Singh et al. | |
| 2007/0282959 A1 | 12/2007 | Stern | |
| 2008/0082255 A1 | 4/2008 | Takahata et al. | |
| 2008/0272907 A1* | 11/2008 | Bonansea | H04M 1/724 |
| | | | 340/539.11 |
| 2010/0257538 A1* | 10/2010 | Zhao | G06F 9/5066 |
| | | | 712/220 |
| 2010/0281402 A1 | 11/2010 | Staikos et al. | |
| 2012/0124176 A1 | 5/2012 | Curtis et al. | |
| 2012/0218277 A1 | 8/2012 | Matilla et al. | |
| 2013/0007662 A1 | 1/2013 | Bank et al. | |
| 2013/0346882 A1* | 12/2013 | Shiplacoff | G06F 3/04842 |
| | | | 715/753 |
| 2013/0346922 A1* | 12/2013 | Shiplacoff | G06F 3/04842 |
| | | | 715/835 |
| 2014/0129661 A1* | 5/2014 | Thyagaraja | G06F 9/542 |
| | | | 709/207 |
| 2014/0179377 A1* | 6/2014 | Song | H04W 4/20 |
| | | | 455/566 |
| 2014/0189030 A1* | 7/2014 | Benchenaa | H04L 51/24 |
| | | | 709/207 |
| 2014/0244738 A1* | 8/2014 | Rydenhag | G06F 3/1423 |
| | | | 709/204 |
| 2014/0273975 A1* | 9/2014 | Barat | H04W 4/12 |
| | | | 455/412.2 |
| 2014/0304700 A1 | 10/2014 | Kim et al. | |
| 2014/0351744 A1 | 11/2014 | Jeon et al. | |
| 2015/0007049 A1* | 1/2015 | Langlois | H04L 12/1895 |
| | | | 715/752 |
| 2015/0095901 A1 | 4/2015 | Cooley et al. | |
| 2015/0177970 A1* | 6/2015 | Choi | H04M 1/72403 |
| | | | 715/752 |
| 2016/0085397 A1* | 3/2016 | Jain | G06F 1/163 |
| | | | 715/828 |
| 2016/0337299 A1* | 11/2016 | Lane | H04L 67/10 |

OTHER PUBLICATIONS

EP Appln. 17782628.6, Communication Pursuant to Article 94(3) EPC, dated Mar. 23, 2020, 5 pg.

Riga, B., "Live Tiles and Push Notifications", [online] Jun. 30, 2012, XP055226325, Microsoft TechEd 2012, Retrieved from the Internet: <http://video.ch9.ms/teched/2012/eu/WPH301.pptx>, 38 pg.

EP Application No. 17782628, Communication under 71(3) EPC, Intention to Grant, dated Jul. 27, 2021, 48 pg.

\* cited by examiner

MANAGING UPDATES IN A COMPUTING SYSTEM USING MULTIPLE ACCESS METHODS

CROSS-REFERENCE TO RELATED APPLICATIONS

This application claims the benefit of U.S. Provisional Patent Application No. 62/320,917 filed on Apr. 11, 2016, which is fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to managing updates in a computing system and, more particularly, to managing updates using multiple access methods.

BACKGROUND

Many computing devices provide a notification framework that provides notifications of available content from applications. The notification framework allows applications to submit a description of the available content and displays notifications of the available content. These notifications are typically provided through a single, unified view or interface.

In some cases, a computing device provides one or more additional, subsidiary locations from which the user may view the notifications. For example, the computing device may display notifications on a "lock screen," through a transient "heads-up" view, as a banner, and so forth. These subsidiary locations simply present a subset of the notifications from the unified view such as the first "N" notifications of a longer list of "N+X" notifications.

Whether using the unified view or a subsidiary view, in some systems, the notifications are presented in chronological order without applying any further mechanism for differentiating between the different notifications. Given the large number of notifications available in modern computing devices, sorting through notifications in order to locate those of interest can be time consuming. Often, this leads the user to treat notifications as nuisances or interruptions to be dismissed as quickly as possible despite some notifications being of greater significance or urgency than others.

SUMMARY

One or more embodiments relate to methods for communicating new information and/or actions. In one aspect, a method is directed to managing updates. The method can include receiving data items corresponding to available content for different applications, determining, using a processor, priorities associated with the data items, and creating updates for the data items using the priorities. The method can also include displaying the updates in different ones of a plurality of views, wherein each view of the plurality of views is configured to display updates of a same priority.

One or more embodiments are related to apparatuses for communicating new information and/or actions. In one aspect, an apparatus includes a memory configured to store program code and a processor coupled to the memory. The processor, in response to executing the program code, is configured to initiate operations directed to managing updates. The operations include receiving data items corresponding to available content for different applications, determining priorities associated with the data items, and creating updates for the data items using the priorities. The operations can also include displaying the updates in different ones of a plurality of views, wherein each view of the plurality of views is configured to display updates having same priorities.

One or more embodiments are directed to computer program products for communicating new information and/or actions. In one aspect, a computer program product includes a computer readable storage medium having program code stored thereon, wherein the program code is directed to managing updates. The program code is executable by a processor to perform operations. The operations can include receiving data items corresponding to available content for different applications, determining priorities associated with the data items, and creating updates for the data items using the priorities. The operations can also include displaying the updates in different ones of a plurality of views, wherein each view of the plurality of views is configured to display updates having same priorities.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

DETAILED DESCRIPTION

Figure 1:
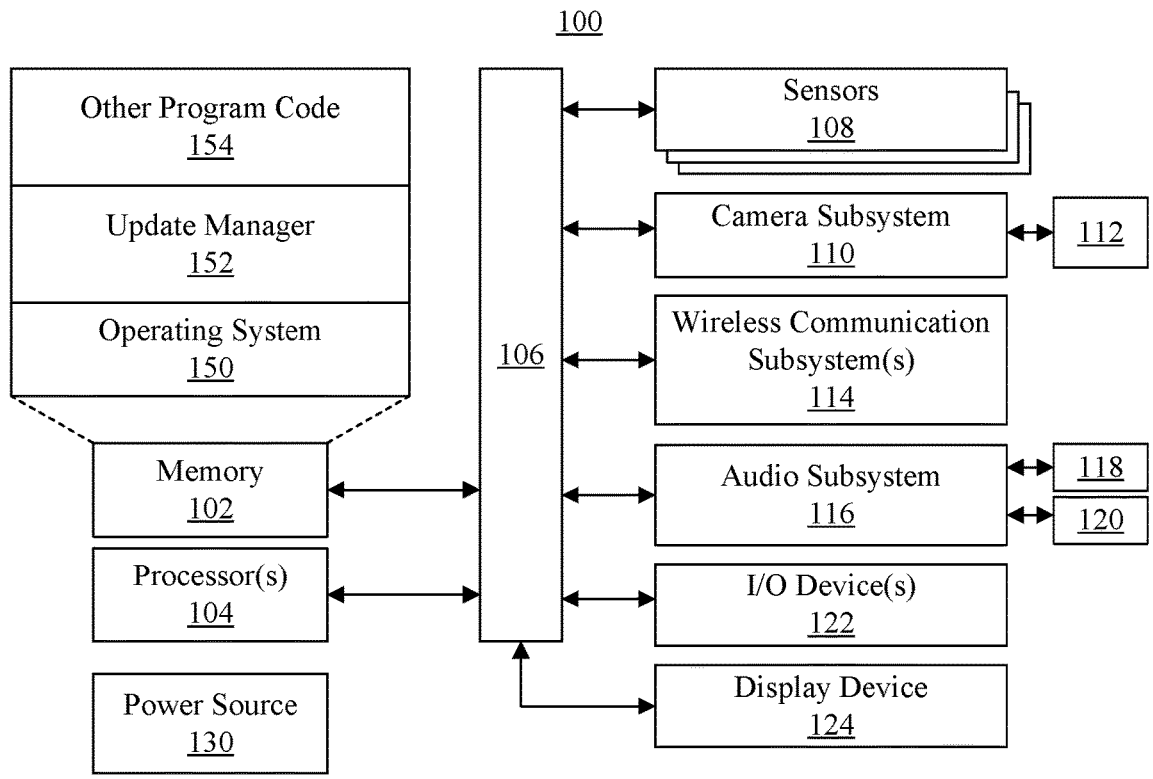
FIG. 1 illustrates an example computing system in accordance with one or more embodiments described within this disclosure.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to communicating the availability of new information and/or actions to users of a computing system. More particularly, this disclosure relates to providing multiple access methods for information updates using a computing system or apparatus. In accordance with the inventive arrangements described herein, multiple access methods are implemented within a computing system to facilitate effective and efficient access and exploration of large numbers of such updates by users. For example, operating system components and applications of the computing system are able to submit information, referred to as data items, relating to the availability of content. Priorities are determined for the data items. Updates are created for the data items using the priorities. The updates can be provided in different locations or "views."

In an embodiment, each view is configured to display updates based upon priority. For example, each view is configured to display updates created for the different applications that have particular or same priority. As an illustrative example, a first view is configured to display updates from the different applications having a high priority. A second and different view is configured to display updates from the different applications having a low priority.

In an embodiment, a combined view is displayed. The combined view includes updates for a particular or same application. The updates for the application within the combined view are not restricted to having a same priority. The updates for the application in the combined view, for example, have different priorities.

In an embodiment, more than one update is generated for a particular data item. For example, in response to receiving a data item, a high priority update and a low priority update may be created for the data item. This capability, which is described in greater detail below, facilitates improved update management in that the high priority update may be dismissed while retaining the low priority update intact or unchanged for future reference or use.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing system (system) 100 in accordance with one or more embodiments described within this disclosure. In the example of FIG. 1, system 100 includes a memory 102, one or more processors 104 (e.g., image processors, digital signal processors, data processors, etc.), and interface circuitry 106. In an aspect, memory 102, processor(s) 104, and/or interface circuitry 106 are implemented as separate components. In another aspect, memory 102, processor(s) 104, and/or interface circuitry 106 are integrated in one or more integrated circuits. The various components in system 100, for example, can be coupled by one or more communication buses or signal lines (e.g., interconnects and/or wires). In one aspect, memory 102 is coupled to interface circuitry 106 via a memory interface (not shown).

In the example shown, sensors 108, subsystems 110, 114, and/or 116, input/output (I/O) devices 122, and/or display device 124 are coupled to interface circuitry 106 to facilitate the functions and/or operations described within this disclosure. Sensors 108, subsystems 110, 114, and 116, I/O devices 122, and/or display device 124 may be coupled to interface circuitry 106 directly or through one or more intervening I/O controllers (not shown).

Examples of sensors 108 that may be included in system 100 can include, but are not limited to, a motion sensor, a light sensor, and/or a proximity sensor to facilitate orientation, lighting, and proximity functions, respectively, for system 100. Further examples of sensors 108 can include, but are not limited to, a location sensor (e.g., a GPS receiver and/or processor) to provide geo-positioning sensor data, an electronic magnetometer (e.g., an integrated circuit chip) to provide sensor data that can be used to determine the direction of magnetic North for purposes of directional navigation, an accelerometer to provide sensor data that can be used to determine change of speed and direction of movement of a device in 3-dimensions, and/or an altimeter (e.g., an integrated circuit) to provide sensor data that can be used to determine altitude.

Camera subsystem 110 is coupled to an optical sensor 112. Optical sensor 112 may be implemented using any of a variety of technologies. Examples of optical sensor 112 can include, but are not limited to, a charged coupled device (CCD), a complementary metal-oxide semiconductor (CMOS) optical sensor, etc. Camera subsystem 110 and optical sensor 112 can be used to facilitate camera functions, such as recording images and/or video clips (hereafter "image data").

Communication functions can be facilitated through one or more wireless communication subsystems 114. Examples of wireless communication subsystems 114 can include, but are not limited to, radio frequency receivers and transmitters, optical (e.g., infrared) receivers and transmitters, and so forth. The specific design and implementation of wireless communication subsystem 114 can depend on the particular type of system 100 implemented and/or the communication network(s) over which system 100 is intended to operate.

For purposes of illustration, wireless communication subsystem(s) 114 may be designed to operate over one or more mobile networks (e.g., GSM, GPRS, EDGE), a WiFi network which may include a WiMax network, a short range wireless network or personal area network (e.g., a Bluetooth network), and/or any combination of the foregoing. Wireless communication subsystem(s) 114 can implement hosting protocols such that system 100 can be configured as a base station for other wireless devices.

Audio subsystem 116 can be coupled to a speaker 118 and a microphone 120 to facilitate voice-enabled functions, such as voice recognition, voice replication, digital recording, and telephony functions. Audio subsystem 116 is capable of generating audio type sensor data.

Examples of I/O devices 122 can include, but are not limited to, track pads, keyboards, pointing devices, communication ports (e.g., USB ports, Ethernet ports, etc.), network adapters (e.g., modems, etc.), buttons or other physical controls, and so forth. Display device 124 may be a screen, a touch sensitive screen, etc. It should be appreciated that a touch sensitive device such as a display screen and/or a pad is configured to detect contact, movement, breaks in contact, etc., (referred to herein as "gestures") using any of a variety of touch sensitivity technologies. Example touch sensitive technologies include, but are not limited to, capacitive, resistive, infrared, and surface acoustic wave technologies, other proximity sensor arrays or other elements for determining one or more points of contact with a touch sensitive device, etc. One or more of I/O devices 122 and/or display device 124 may be adapted to control functions of sensors 108, and/or subsystems 110, 114, and/or 116 of system 100.

System 100 further includes a power source 130. Power source 130 is capable of providing electrical power to the various elements of system 100. In an embodiment, power source 130 is implemented as one or more batteries. The batteries may be implemented using any of a variety of different battery technologies whether disposable (e.g., replaceable) or rechargeable. In another embodiment, power source 130 is configured to obtain electrical power from an external source and provide power (e.g., DC power) to the elements of system 100. In the case of a rechargeable battery, power source 130 further may include circuitry that is capable of charging the battery or batteries when coupled to an external power source.

Memory 102 can include volatile memory and/or non-volatile memory. An example of volatile memory is random access memory. Examples of non-volatile memory can include, but are not limited to, one or more magnetic disk storage devices, one or more optical storage devices, flash memory, etc. Memory 102 can store program code such as operating system 150, update manager 152, and other program code 154. Operating system may be any of a variety of different operating systems including a mobile device operating system, an embedded operating system, etc. Operating system 150 may include instructions for handling system services and for performing hardware dependent tasks.

In the example of FIG. 1, memory 102 stores update manager 152. Update manager 152, upon execution, facilitates update processing as described within this disclosure. For example, update manager 152, when executed, is capable of receiving data items from applications, determining priorities for such data items, creating updates, and controlling the display of updates in different ones of the views described herein. In an aspect, update manager 152 includes or implements access methods that generate the views described herein. Further aspects of operations performed through execution of update manager 152 are described in greater detail with reference to the remaining figures.

Memory 102 may also store other program code 154. Examples of other program code 154 may include instructions that facilitate communicating with one or more additional devices, one or more computers and/or one or more servers; graphic user interface processing; sensor-related processing and functions; phone-related processes and functions; electronic-messaging related processes and functions; Web browsing-related processes and functions; media processing-related processes and functions; GPS and navigation-related processes and functions; security functions; camera-related processes and functions including Web camera and/or Web video functions; and so forth. Other program code 154 further may include one or more applications such as the various applications described herein capable of providing data items corresponding to available content as managed by update manager 152.

Memory 102 may also store various types of data (not shown) such as sensor data, data items from applications, updates of various priorities, and so forth.

The various types of instructions and/or program code described are provided for purposes of illustration and not limitation. The program code may be implemented as separate software programs, procedures, or modules. Memory 102 can include additional instructions or fewer instructions. Furthermore, various functions of system 100 may be implemented in hardware and/or in software. For example, one or more functions of system 100 may be implemented as one or more signal processing and/or application specific integrated circuits.

Program code stored within memory 102 and any data used, generated, and/or operated upon by system 100 are functional data structures that impart functionality when employed as part of the system or device. Further examples of functional data structures include, but are not limited to, data items corresponding to available content from applications, updates generated for and/or in response to the data items, priority data, and so forth.

In an embodiment, one or more of the various sensors and/or subsystems described with reference to system 100 may be separate devices that are coupled or communicatively linked to system 100 through wired or wireless connections. For example, one or more or all of the various sensors 108 described in connection with FIG. 1 may be implemented as separate systems or subsystems that couple to system 100 by way of I/O devices 122 and/or wireless communication subsystem(s) 114.

System 100 may include fewer components than shown or additional components not illustrated in FIG. 1 depending upon the particular type of system that is implemented. In addition, the particular operating system and/or application(s) and/or other program code included may also vary according to system type. Further, one or more of the illustrative components may be incorporated into, or otherwise form a portion of, another component. For example, a processor may include at least some memory.

System 100 is provided for purposes of illustration and not limitation. An apparatus, device, and/or system configured to perform the operations described herein may have a different architecture than illustrated in FIG. 1. The architecture may be a simplified version of the architecture described in connection with system 100 and include a processor, memory storing instructions, and a display device.

Examples implementations of system 100 may include, but are not to limited to, a smart phone or other mobile device or phone, a wearable computing device (e.g., smart watch, fitness tracker, patch, etc.), a computer (e.g., desktop, laptop, tablet computer, other data processing system, etc.), and any suitable electronic device capable of performing the functions described herein. Furthermore, it will be appreciated that embodiments can be deployed as a standalone device or deployed as multiple devices in a distributed client-server networked system. In an embodiment, the system is implemented as two or more devices such as a first device (e.g., a smart watch or fitness tracker) paired to operate with a second device (e.g., a mobile phone, a tablet computer, computer system, etc.).

Figure 2:
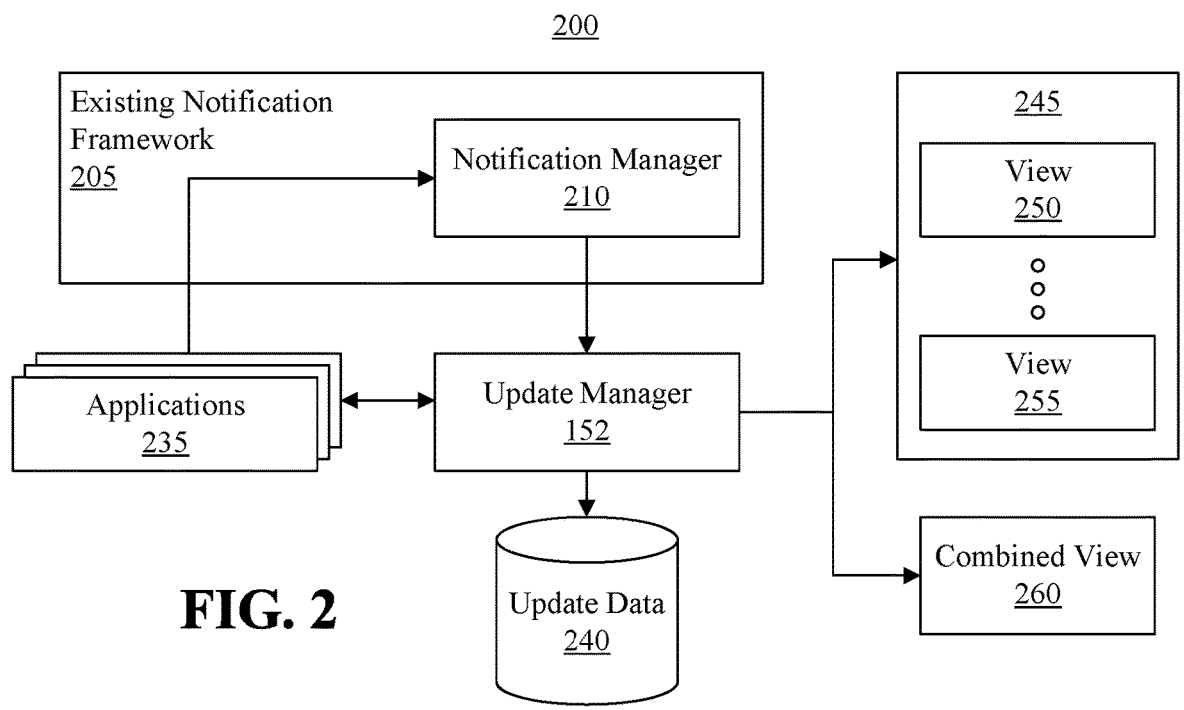
FIG. 2 illustrates an example of an update framework that is executable by a computing system as described in connection with FIG. 1.

FIG. 2 illustrates an example of an update framework 200 that is executable by a computing system as described in connection with FIG. 1. FIG. 2 is an example implementation where an existing notification framework 205 is used in cooperation with update manager 152 to display different views for updates. In an aspect, the views present updates based upon priorities of the updates.

In an embodiment, existing notification framework 205 includes a notification manager 210. Notification manager 210 is capable of receiving data items from one or more different applications 235. The data items correspond to the availability of content for respective ones of applications 235. For example, each data item describes content that is newly available for one of applications 235. In this regard, a data item refers to data structure, e.g., an object, that includes multiple elements. In an aspect, applications 235 include operating system components (e.g., operating system program code) for which content is newly available. The term "content" refers to data that an application may operate on, convey, or present such as articles, pictures, messages, posts, etc. Within this disclosure, the term "content" or "available content," in the context of update creation and/or display, refers to newly available content. Newly available content includes new content and/or modified content.

A data item corresponding to available content describes the content that is newly available. A data item, for example, may specify a time that the content became available, the source application (e.g., the application and/or operating system component that generated or sent the data item), a title for the content, a textual description of the content, a thumbnail image for the content, optionally one or more candidate actions for the content, and so forth.

Framework 200 further includes update manager 152. Update manger 152 communicates with notification manager 210 and applications 235. In an embodiment, update manager 152 is capable of receiving, from notification manager 210, the data items sent from applications 235. In another embodiment, update manager 152 is capable of receiving updates generated by notification manager. For purposes of discussion, the data passed from notification manager 210 to update manager 152 are referred to as "data items," though it should be appreciated that since notification manager 210 is part of an existing infrastructure, the data items may be notifications.

Update manager 152 is capable of processing the data items received from notification manager 210 to determine priority information for the data items. In an embodiment, update manager 152 is also capable of determining a type of the data items received. In an example, the type of a data item may be determined based upon a source of the data item as "operating system" or "application." An operating system type, for example, refers to a data item generated by the operating system. An operating system type of data item may correspond to or describe content for the operating system (e.g., new or updated program code). An application type of data item, for example, refers to a data item generated by an application.

Update manager 152 is capable of generating or creating updates for the data items and storing the updates within update data 240 in memory. Update manager 152 is capable of storing the updates in association with the priorities for the data items from which the respective updates are created. Update manager 152 is also capable of storing the updates in association with any determined types.

In an embodiment, an update is data generated from a data item or portions of a data item. The update is displayed in a view rendered or displayed on a display device. In an example, an update is capable of indicating potential actions that are available for interacting with the update and/or the content represented by the update. The potential actions may be provided as part of the data item or determined based upon type of the data item.

In the example of FIG. 2, a multiple different, e.g., a plurality of, views 245, may be generated by update manager 152. Plurality of views 245 are configured to display updates based upon priority. Each different view of the plurality of views 245 is capable of displaying updates of a same or particular priority. The updates within a view of the plurality of views 245 may be for different ones of applications 235. In other words, view 250 includes updates from two or more different ones of applications 235 where each update in view 250 has a same priority (e.g., a high priority). View 255 includes updates from two or more different ones of applications 235 (which may or may not be the same ones of applications 235 for which updates are displayed in view 250) where each update in view 255 has a same priority (e.g., a low priority). The priority of the updates in view 250 is different from the priority of the updates in view 255. In an aspect, views 250 and 255 may be displayed one-at-a-time, e.g., not concurrently.

Plurality of views 245 shows two example views. It should be appreciated that more than two different views may be included where each view is dedicated to displaying updates having a particular priority. In this regard, priorities between "high" and "low" may be used.

In an embodiment, update manager 152 is capable of generating a combined view 260. Combined view 260 is distinct from plurality of views 245. Combined view 260 is capable of displaying updates for a selected application, e.g., only for the selected application. The updates displayed in view 260 may have different priorities. In an aspect, combined view 260 is capable of displaying all updates for the selected application regardless of priority.

In an embodiment, update manager 152 is capable of receiving data specified by user inputs, e.g., user interactions, with updates in view 250, 255, and/or 260. The data, for example, may be a dismissal of an update, an access of content of the update such as a selection of the update to process the update and/or content represented by the update, etc. Update manager 152 is capable of providing the received data to the appropriate one of applications 235 for further processing.

FIG. 2 illustrates an example implementation where users are able to access updates through multiple primary locations (e.g., views) based upon priority of the updates. In some cases, a data item may cause or lead to the creation of more than one update, where different ones of the updates appear in different views. For example, a data item may cause the creation of an update appearing in view 250 and another update appearing in view 255. In this regard, a data item, or portion thereof, effectively appears, in whole or in part, in multiple, different views, e.g., view 250 and view 255, though not concurrently.

In an embodiment, each of the views illustrated in FIG. 2 is reached through execution of program code referred to as an "access method." For example, there may be a one-to-one correspondence between access methods and the views illustrated in FIG. 2. Further, access methods may be initiated or executed in response to receiving a particular user input or gesture. For example, in response to detecting a first user input such as a gesture swiping up on a touch sensitive display device, the system may execute a first access method that displays view 250. In response to detecting a second and different user input such as a gesture swiping down on a touch sensitive display device, the system may execute a second and different access method that displays view 255. In response to detecting yet another user input, e.g., a gesture and/or user interaction, the system is capable of executing the access method that displays combined view 260. In another aspect, an access method configured to display high priority updates may be executed in response to receipt of the high priority data item and/or creation of the corresponding high priority update to display the high priority update immediately. The access methods described may be embodied as update manager 152.

In the example of FIG. 2, framework 200 utilizes existing notification framework 205. In another embodiment, framework 200 does not include existing notification framework 205. In that case, update manager 152 is implemented as a standalone framework for handling updates, which may include updates presented as notifications, that replaces existing notification framework 205. For example, update manager 152 may interact directly with applications 235 to receive data items and perform the functions shown. In doing so, update manager 152 replaces and/or extends the functionality of existing notification framework 205.

Figure 3:
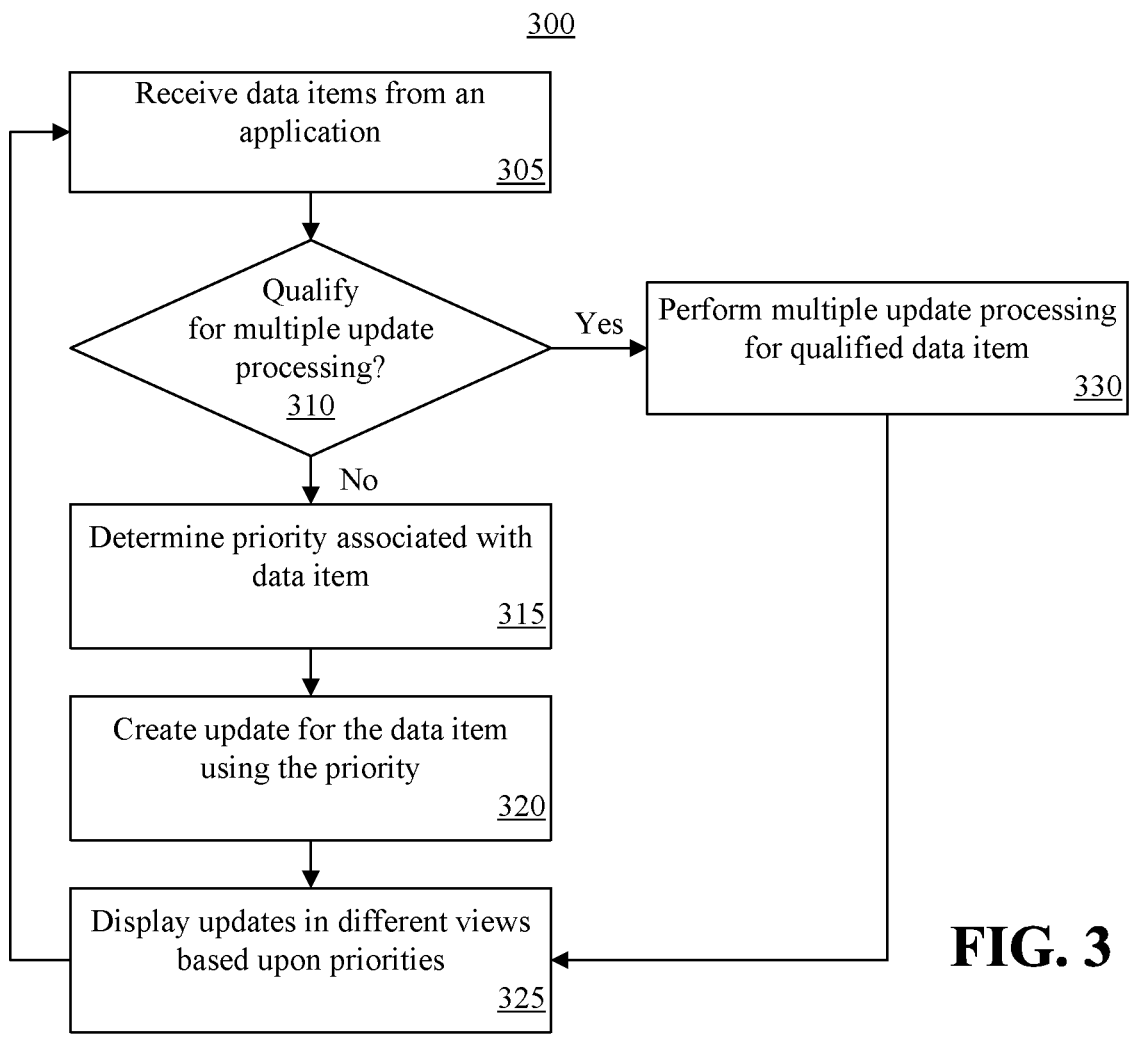
FIG. 3 illustrates an example method of managing updates.

FIG. 3 illustrates an example method 300 of managing updates. Method 300 is performed by a system as described herein in connection with FIGS. 1 and 2. In block 305, the system receives a data item from an application. The data item is received from one of a plurality of different applications. In an aspect, the applications are executing locally within the system. As discussed, each data item corresponds to, or represents, available content for an application, e.g., the source application.

In an embodiment, blocks 310 and 330 of method 300 are optional. Blocks 310 and 330 implement multiple update processing. Multiple update processing refers to the capability of the system to generate two (or more) updates of differing priorities for, or in response to receiving, a single data item. Accordingly, in block 310, the system determines whether any of the received data items qualify for multiple update processing. In an embodiment, the system is capable of determining whether a received data item qualifies for multiple update processing based upon the source application, the type of content that is available as specified by the data item, and/or a combination of both. As such, the system is capable of automatically determining whether a given data item qualifies for multiple update processing. In an aspect, a user may specify the properties of a data item that, when detected by the system, cause the system to perform multiple update processing for the data item. For example, the user may specify the properties through a system setting user interface and/or via application-specific user interfaces. The user may indicate that data items from a particular application are to undergo multiple update processing, that data items for particular content are to undergo multiple update processing, and/or data items from a particular application and that are for particular content are to undergo multiple update processing.

In response to determining that the data item qualifies for multiple update processing, method 300 continues to block 330. In block 330, the system performs multiple update processing for qualified data item. For purposes of discussion, a data item that qualifies for multiple update processing is referred to herein as a "qualified data item." Further examples of multiple update processing are described in connection with FIGS. 4-7. In response to determining that the data item does not qualify for multiple update processing, method 300 continues to block 315.

In block 315, the system determines a priority associated with the data item. The system is capable of determining the priority for a data item using any of a variety of different mechanisms and/or combinations of mechanisms. In an embodiment, the priority of a data item is specified by the source application. For example, the source application is capable of applying a priority to the data item. The priority is included with or within the data item as provided to the update manager. In that case, the update manager detects the priority for the data item and uses the priority specified by the application. In an aspect, the application may assign all data items the same priority. In another aspect, the application may assign different data items different priorities. For example, a data item corresponding to an update to the application itself may be assigned a low priority, while a data item corresponding to a different type of update such as the receipt of a new message or other type of content available from the application may be assigned a high priority.

In an embodiment, priority of data items may be specified by a user. In an aspect, the system, e.g., the update manager, may provide a user interface that allows a user to specify priorities for different data items. The priorities may be specified based upon source application, content type, and so forth. In another aspect, an application may provide a user interface that allows the user to specify priorities for data items generated by the application.

In an embodiment, the system, e.g., the update manager, is capable of determining the priority of the data item automatically. The system is capable of determining priority using any of the above-described techniques. For example, the update manager is capable of determining the source application of the data item and/or determining the type of content that is available. The update manager is capable of determining a priority for the data item based upon the source application, the type of content that is available, or a combination of both.

As an illustrative example, the update manager is capable of assigning data items corresponding to particular content such as a newly received electronic mail, a newly received instant message, a newly received social media message, etc. a high priority. The update manager may assign data items corresponding to the availability of new content such as articles, movies, and/or music a lower priority. In these examples, the priority may be determined based upon the source application and/or the type of content. It should be appreciated that the system may determine different priorities for different data items from a same source application based upon the type of content represented by each respective data item.

In an embodiment, the system is capable of determining priority based upon the substance of the content of the data item. The system is capable of applying text analysis, e.g., keyword analysis, natural language processing, semantic processing, named entity recognition, and so forth, to content of a data item to determine priority of the data item. As an illustrative example, the system is capable of identifying particular keywords and/or phrases such as "breaking news" within the content of the data item. The keywords and/or phrases may be associated with a priority that can be used or applied to the data item. In another example, the system is capable of recognizing or detecting particular names, e.g., family members of the user, within the content of the data item. The system is capable of prioritizing the data item based upon a priority associated with the detected family member or category or classification of person detected. Family members, for example, may have a high priority, co-workers another priority, and friends another priority, etc.

In an embodiment, the system is capable of determining the priority of the data item based upon historical user interactions. In an aspect, historical user interactions refer to the user's historical response time. The update manager is capable of maintaining a history of response times. A response time is the amount of time that elapses from a start condition and the user of the system interacting with the update. The start condition may be the time that the application issues the data item resulting in the creation of the update, the time of creation of the update, or the time that the update is actually displayed within a view. The term interacting with the update may refer to dismissing the update, accessing content of the update (e.g., acting on the update), etc. The update manger may store the response times on a per application basis. The update manager is capable of determining a historical response time for each application. For example, the historical response time may be a mean of the response times for updates on a per-application basis.

Accordingly, in response to receiving the data item, the update manager is capable of looking up the historical response time for the source application of the data item. The update manager is capable of determining a priority for the data item based upon the historical response time. The update manager, for example, cross-references the historical response time of the source application of the data item in a table or other data structure that correlates historical response times with priorities to determine a priority for the data item.

In another aspect, historical user interaction refers to frequency of use of an application by a user. The system is capable of determining the frequency of use of an application by a user over time. In that case, the update manager, in response to receiving the data item, determines the frequency of use of the source application. The update manager, for example, cross-references the frequency of use of the source application in a table or other data structure that correlates frequency of use of applications with priorities to determine a priority for the data item.

In another aspect, the system is capable of using both historical response time and frequency of use to determine priority of the data item. For example, the system is capable of applying a weighting factor between 0 and 1 to each of the historical response time and the frequency of use, calculating a sum of the weighted quantities, and cross-referencing the resulting sum into a table or other data structure to determine a priority for the data item.

In an embodiment, the system is capable of using any of the priority determination techniques described herein in isolation. In one or more other embodiments, the system is capable of using any combination of two or more of such priority determination techniques. For example, the system is capable of calculating an initial priority (e.g., an initial score) using each desired or selected priority determination technique, optionally applying a weighting factor to each initial priority, and summing the results to determine a final priority for the data item.

In block 320, the system creates an update for the data item using the priority. For example, the system generates an update having a particular structure or syntax that the system is capable of displaying in a view. The update may include all the data of the received data item, portions of the data of the received data item, and/or additional data that may be generated by the update manager. The update is associated with, or includes, the priority of the data item from which the update is created.

It should be appreciated that blocks 305-320 (e.g., and block 330) may be performed iteratively to process a plurality of data items received from the applications. The data items may be associated with different priorities as described.

Accordingly, in block 325, the system is capable of displaying updates in different views based upon the priorities. The system is capable of displaying any of a plurality of different views. In an aspect, each view of the plurality of views is configured to include updates having a unique and same priority. For example, a first view is dedicated for displaying high priority updates, a second view is dedicated for displaying low priority updates, etc. In an aspect, the views are displayed one-by-one, e.g., in serial fashion in response to particular conditions. As such, the displays are not displayed concurrently.

Regarding block 325, in an embodiment, the system is capable of displaying a first view configured to display high priority updates responsive to receiving a first user input, e.g., a gesture. The system is capable of displaying a second view configured to display low priority updates responsive to receiving a second and different user input, e.g., a different gesture.

Regarding block 325, in another embodiment, the system is capable of displaying updates with a selected priority, e.g., a high priority, responsive to creation of the update without first receiving a user input requesting display of the high priority updates. As an illustrative example, the system is capable of displaying a high priority update corresponding to a received text message or social media post in response to creation of the update as opposed to waiting for a user request to display high priority updates.

Within the views, updates may be sorted, e.g., ordered, and displayed based upon various combinations of criteria. The order in which updates are displayed in each view may be determined or set independently of other views. As such, one or more views may use the same criteria for ordering updates, one or more views may use different criteria for ordering updates, or each view may use different criteria for ordering updates.

In an embodiment, the system is capable of sorting or ordering (hereafter "ordering") updates temporally. The system may order updates from newest to oldest or from oldest to newest. In an example, the system is capable of assigning times to an update that is a summary of multiple updates, e.g., a summary tile as illustrated hereinbelow, based on the time of the oldest or the newest update represented by the summary. The time used may be a preference that can be set within the system.

In an embodiment, the system may allow users to specify a preferred ordering of applications that may be used by the system to order updates in a view. In one or more other embodiments, the system is capable of ordering updates in a view based upon historical interactions such as response time, frequency of use of applications, or a combination of the two as previously described in connection with determining priorities.

The example embodiments described within this disclosure enable a system to display updates in a manner that allows users to easily locate and check high priority updates without having to potentially find such high priority updates amidst a large number of low priority updates. The system is capable of clearly showing when a new high priority update has arrived since the user need not continually clear or dismiss low priority updates. The example embodiments provide views as part of a user interface that facilitates browsing of a potentially large number of low priority updates when users have spare time to do so or for when users are interested in more broadly determining that new content is available.

Figure 4:
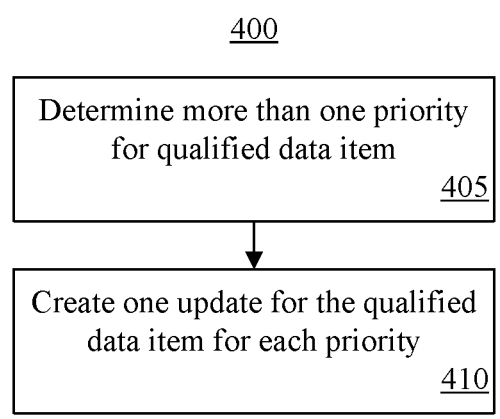
FIG. 4 illustrates an example method of multiple update processing.

FIG. 4 illustrates an example method 400 of multiple update processing. Method 400 is performed by a system as described herein in connection with FIGS. 1 and 2. In an embodiment, method 400 may be performed to implement block 330 of FIG. 3. Multiple update processing allows the system to create two or more updates for a single data item, where each of the updates generated, referred to as "corresponding updates," have different priorities. For example, the system is capable of generating a high priority update for a data item that can be dismissed by the user if desired while still retaining a low priority update for the same data item. The low priority update may remain in effect until the user addresses the low priority update.

As an illustrative example, the system is capable of creating both a high priority update and a low priority update for a data item indicating availability of a news article. In this example, the user may dismiss the high priority update in the case where the user does not have time to read the article. The user is reminded of the available content because the low priority update remains intact and unaffected. The next time that the user initiates the low priority view, the low priority update will be shown in the view.

Accordingly, in block 405, the system, having determined that a received data item qualifies for multiple update processing, determines more than one priority for the qualified data item. As an illustrative example, the system is capable of receiving a data item and, in response to determining that the data item is from a selected source application, assign both a high priority and a low priority to the data item.

In another example, the system may assign a first priority to the data item based upon the source application of the data item and/or the type of content that is updated as indicated by the data item. The system may assign a second and different priority to the data item based upon historical data as described above, whether historical response time and/or frequency of use of the source application. Thus, based upon the source application and/or content type, the system may determine a low (high) priority for the data item and, based upon historical data determine a high (low) priority for the data item.

In block 410, the system creates one update for the qualified data item for each priority determined in block 405. Accordingly, in the case where the qualified data item is associated with both a high priority and a low priority, the system is capable of creating a high priority update and a low priority update. Appreciably, each of the two updates for the qualified data item are displayed in different views based upon priority.

While the examples described in connection with FIG. 4 utilize two priorities, it should be appreciated that multiple update processing may determine more than two priorities for a data item and correspondingly create more than two updates.

Figure 5:
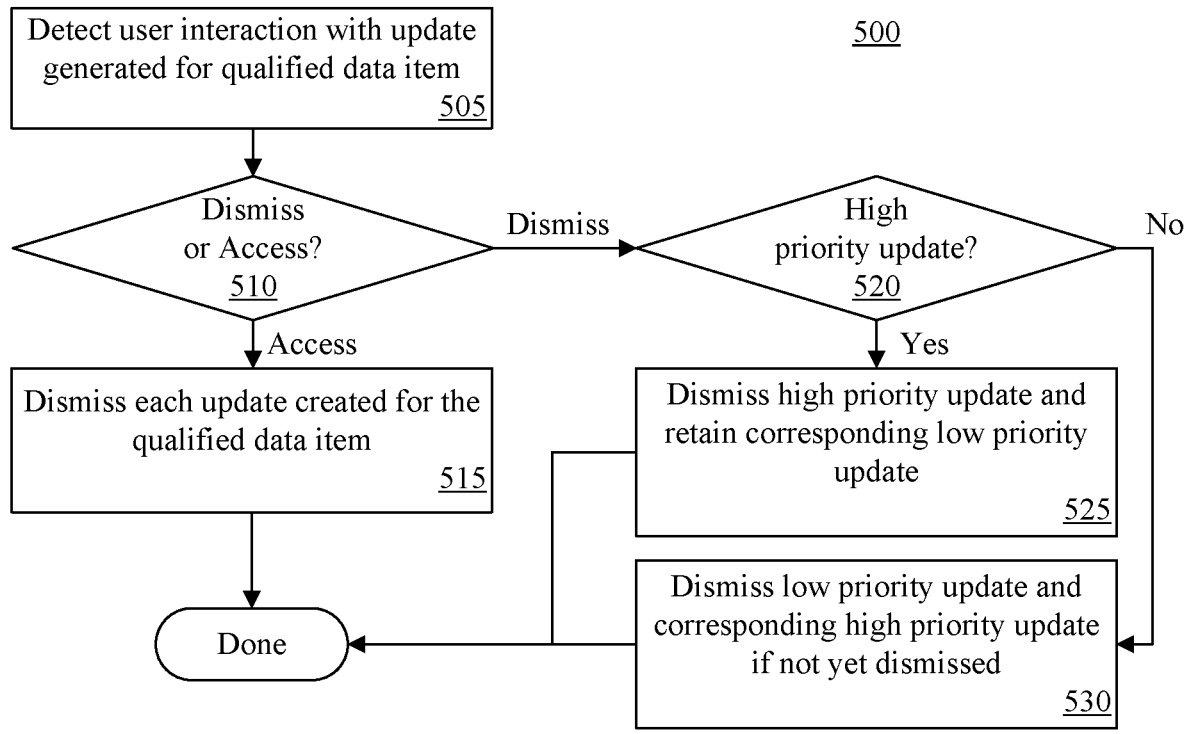
FIG. 5 illustrates an example method of managing updates created using multiple update processing.

FIG. 5 illustrates an example method 500 of managing updates created using the multiple update processing described herein in connection with FIGS. 3 and 4. Method 500 is performed by a system as described herein in connection with FIGS. 1 and 2.

In block 505, the system detects a user interaction with an update created from a qualified data item. The update is one of a plurality of corresponding (e.g., different) updates having different priorities created for the qualified data item.

In block 510, the system determines whether the interaction is a dismissal of the update or is an access of the update. An access refers to a user interaction that directly accesses the content referenced by the update. For example, an access by a user may launch the source application or a function thereof thereby allowing the user to interact with the content referenced by the update. If the user interaction is a dismissal, method 500 continues to block 520. If the user interaction is an access, method 500 proceeds to block 515.

Proceeding with block 515, the system dismisses each of the updates created for the qualified data item. For example, if both a high priority update and a low priority update were created for the qualified data item, both the high priority update and the low priority update for the qualified data item are dismissed or cleared in block 515. Both updates are cleared since the user acted upon the update.

In block 520, in response to determining that the detected user interaction is a dismissal of the update, the system determines whether the update that was dismissed was a high priority update. If so, method 500 continues to block 525. If not, method 500 proceeds to block 530.

In block 525, the system dismisses the high priority update and retains the corresponding low priority update, e.g., the low priority update created for the same qualified data item as the high priority update that was dismissed. In cases where the system utilizes more than two levels of priority, the system is capable of retaining the corresponding lower priority updates, e.g., those updates for the same qualified data item having a lower priority than the dismissed higher priority update.

In block 530, the system dismisses the lower priority update from block 505 and, if any higher priority updates for the qualified data item have not yet been dismissed, dismisses such higher priority updates. For example, in response to a dismissal of a low priority update for the qualified data item, the system also dismisses the corresponding high priority update for the qualified data item if not yet already dismissed.

Figure 6:
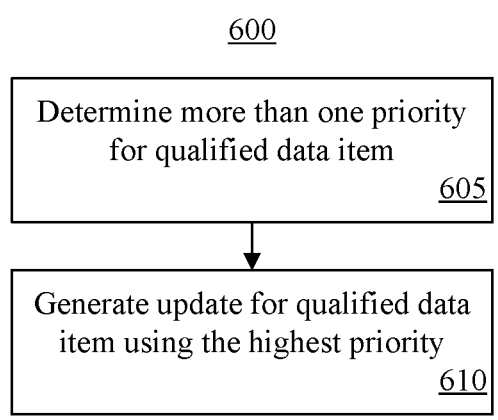
FIG. 6 illustrates another example method of multiple update processing.

FIG. 6 illustrates another example method 600 of multiple update processing. Method 600 is performed by a system as described herein in connection with FIGS. 1 and 2. In an embodiment, method 600 may be performed to implement block 330 of FIG. 3. In the example of FIG. 6, multiple updates for a same data item are not immediately generated as described with reference to FIG. 4.

In block 605, the system, having determined that a received data item qualifies for multiple update processing, determines more than one priority for the qualified data item. In block 610, the system creates one update for the qualified data item for the highest priority associated with the qualified data item. The system may store any additional priorities determined for the qualified data item that have not been used to create an update.

Figure 7:
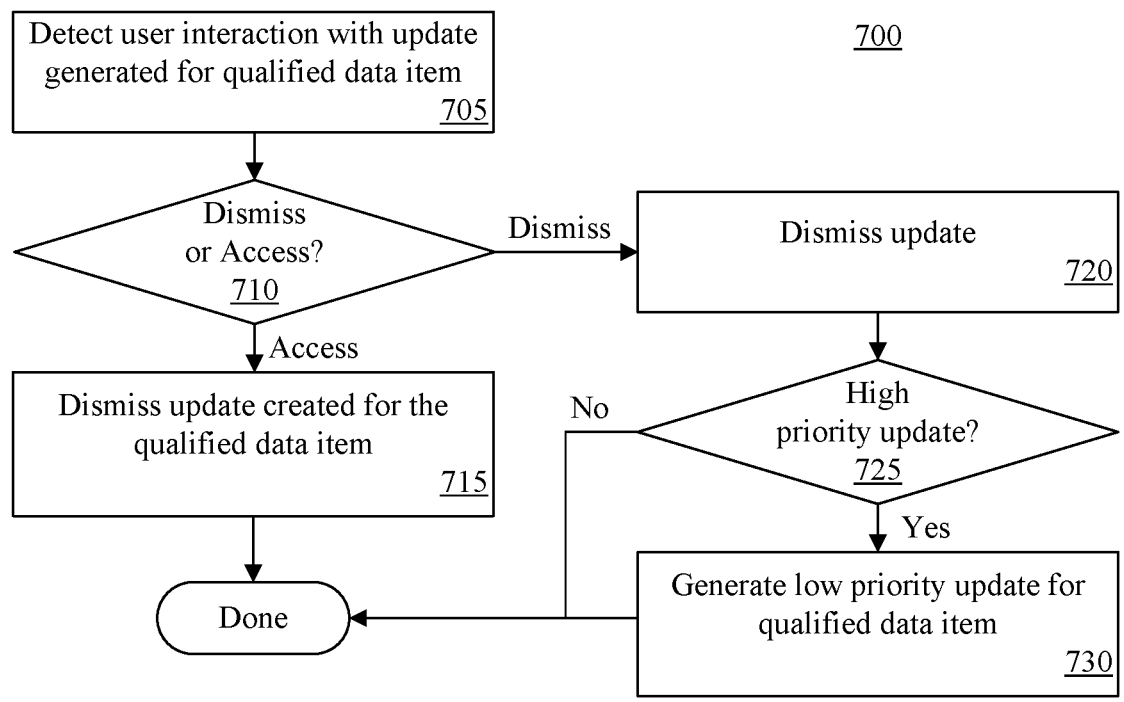
FIG. 7 illustrates another example method of managing updates created using multiple update processing.

FIG. 7 illustrates another example method 700 of managing updates created using the multiple update processing described herein in connection with FIGS. 3 and 6. Method 700 is performed by a system as described herein in connection with FIGS. 1 and 2. Method 700 is similar to method 500 with the exception that additional updates for multiple update processing are not created until a high priority update is first dismissed.

In block 705, the system detects a user interaction with an update created from a qualified data item. In block 710, the system determines whether the interaction is a dismissal of the update or is an access of the update. If the user interaction is a dismissal, method 700 continues to block 720. If the user interaction is an access, method 700 proceeds to block 715. In block 715, the system dismisses the update from block 705. After block 715, method 700 ends. In this case, the user has accessed the update, whether low or high priority, and no further processing need be performed.

In block 720, the update from block 705 is dismissed. In block 725, the system determines whether the update dismissed in block 720 was a high priority update. If so, method 700 continues to block 730. If not, method 700 ends.

In block 730, the system creates a low priority update for the qualified data item. For example, referring to FIG. 6, the system creates an update using the as yet unused and lower priority for the qualified data item. In an aspect, creation of the lower priority update for the qualified data item is performed in response to dismissal of the corresponding higher priority update.

Figure 8:
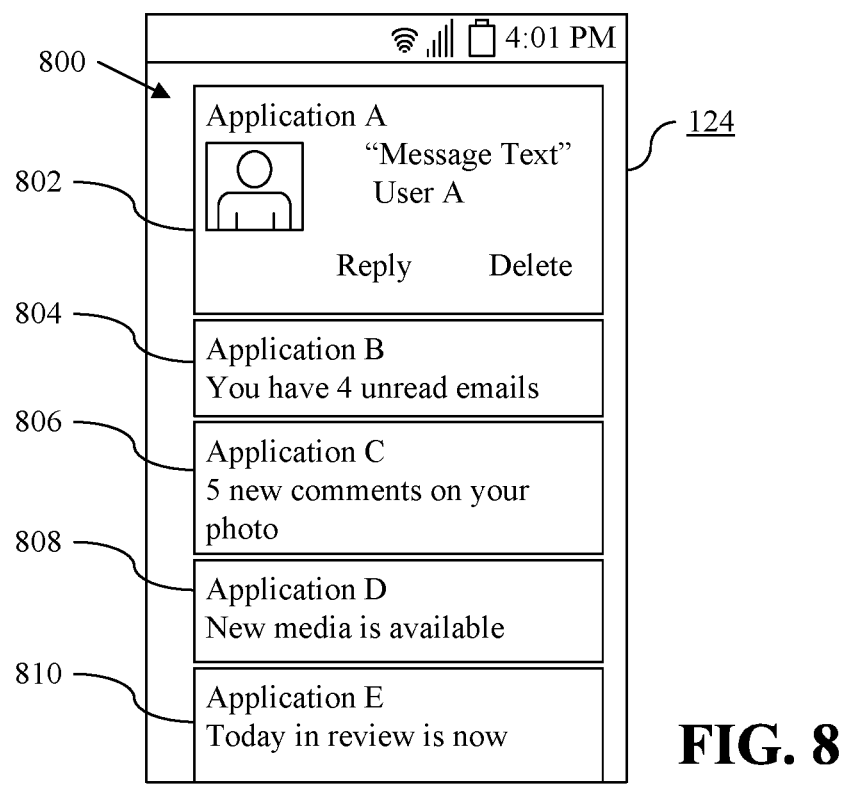
FIG. 8 illustrates an example of a view configured to present updates.

FIG. 8 illustrates an example of a view 800 configured to present updates. View 800 is displayed on display device 124. As pictured, view 800 includes a plurality of updates 802, 804, 806, 808, and 810. In the example of FIG. 8, each update 802-810 shown in view 800 has a same priority. Further, as illustrated, updates may be from different applications. View 800 may be scrollable, e.g., where the user may swipe up or down to view additional updates that may be included within view 800.

In an illustrative example, each of updates 802-810 is associated with a low priority. As such, view 800 is configured to display low priority updates. Low priority updates allow applications to communicate the availability of new content without interrupting the user. In an aspect, view 800 is generated in response to detecting a user input, e.g., a gesture, such as a swipe down, etc. The user input used to invoke view 800 may be specific to view 800, at least with respect to a plurality of views that are configured to display updates based upon priority.

Update 802 illustrates an example of an update that includes quick actions or shortcuts. As pictured, a "Reply" and a "Delete" control are provided that may be accessed by the user. The user may utilize the "Reply" or the "Delete" control to directly access and/or act upon the content indicated by the update directly.

Figure 9:
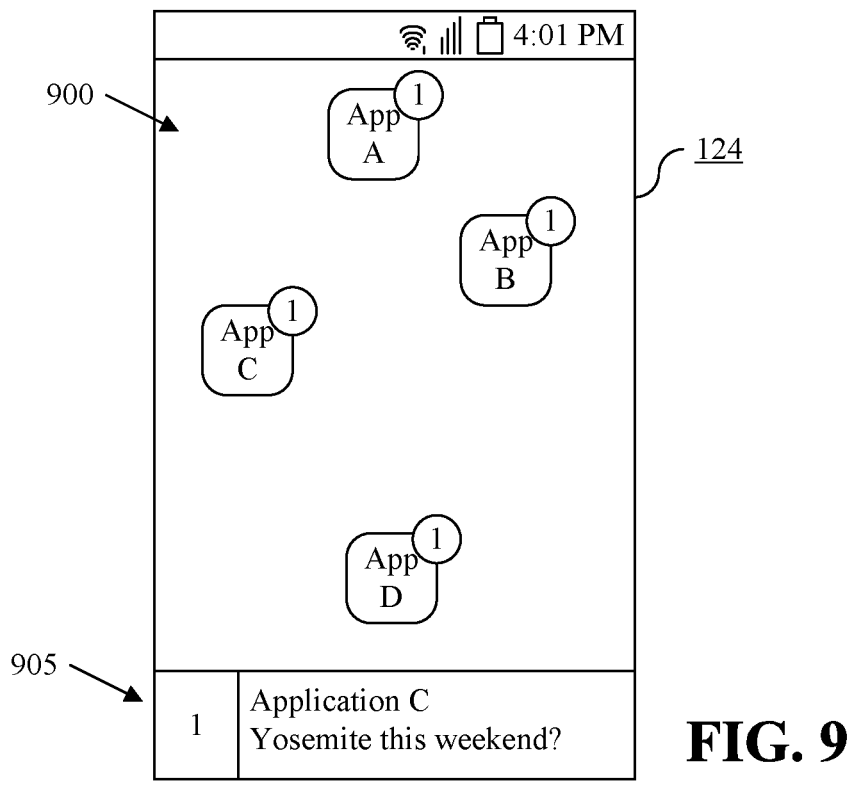
FIG. 9 illustrates another example of a view configured to present updates.

FIG. 9 is another example of a view 900 configured to present updates. View 900 is displayed on display device 124. As pictured, view 900 includes a high priority update 905. In the example of FIG. 9, high priority update 905 is considered to be important enough to merit interrupting the user. The set of high priority updates can be managed in accordance with the example embodiments described herein to limit interruptions to the user.

FIGS. 8 and 9 illustrate examples where different types of updates are provided through different views (e.g., different locations) using different access methods invoked using different user inputs. Further example implementations may include high priority updates in a view that the system displays in response to a user gesture pulling down from the top of display device 124 (e.g., touchscreen) and low priority updates in a different view that the system displays in response to a user gesture pulling up from the bottom of display device 124. In another example, the system may locate high priority updates in a view that is displayed in response to a user gesture pulling down from the top of display device 124 while placing low priority updates in a view that is displayed in the far left (right) of the user's home screens, e.g., in a leftmost (rightmost) home screen where the system is capable of displaying multiple different home screens one at a time using display device 124. Stated another way, in some embodiments, the distinct views for updates of different priorities are not displayed concurrently. In yet another example, the system is capable of displaying a view including high priority updates at the bottom of display device 124 (e.g., at the bottom of the user's home screen) and displaying low priority updates in the leftmost (rightmost) of the user's home screens.

Figure 10:
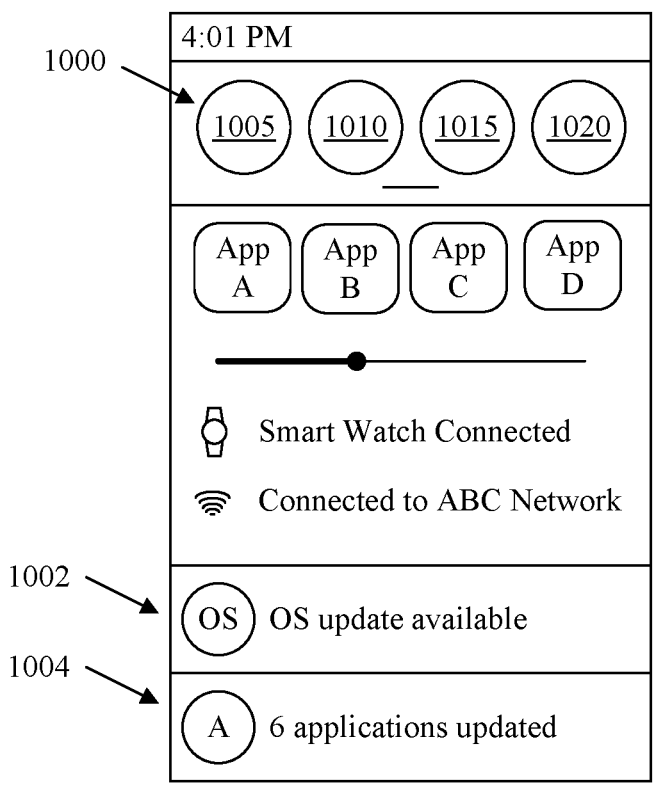
FIG. 10 illustrates another example of a view configured to present updates.

FIG. 10 illustrates another example of a view 1000 configured to present updates. View 1000 is displayed on display device 124. View 1000 illustrates an example where other types of updates may be displayed. In the example of FIG. 10, view 1000 includes a mixture of controls and updates. For example, view 1000 displays control icons 1005, 1010, 1015, and 1020 corresponding to various functions such as activating/deactivating wireless transceivers for short range communication and/or for personal area networks, entering airplane mode, activating/deactivating vibrate mode, etc. View 1000 further includes icons for frequently used applications corresponding to App A, App B, App C, and App D.

In an embodiment, view 1000 provides a dedicated primary location, or view, for updates from the operating system of the computing device or from applications of the system to be displayed. As an illustrative example, update 1002 indicates that an update to the operating system is available. Update 1004 is an example of an update that provides a summary of other updates. Update 1004 summarizes that 6 applications have been updated.

In an embodiment, a view may be provided that provides access to high priority updates at the bottom of the home screen, low priority updates on the leftmost home screen, and system updates at the top of the home screen. In another embodiment, the system is capable of providing access to system updates, persistent updates, and updates that provide access to actions rather than information (e.g., media controls) in the same location. The updates can include system and/or application quick actions and/or other shortcuts.

Figure 11A:
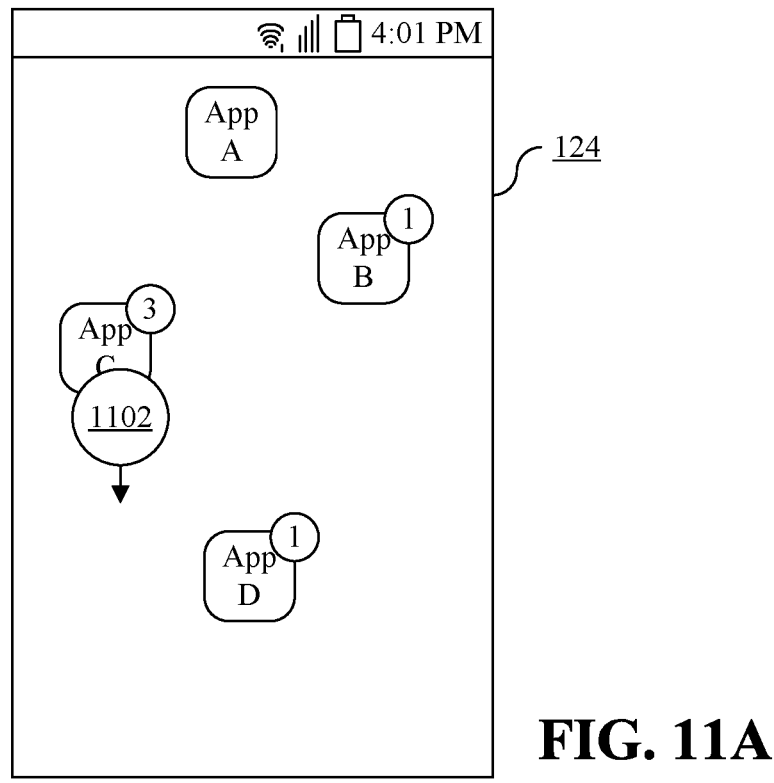
FIGS. 11A and 11B, taken collectively, illustrate an example of an application specific view.
Figure 11B:
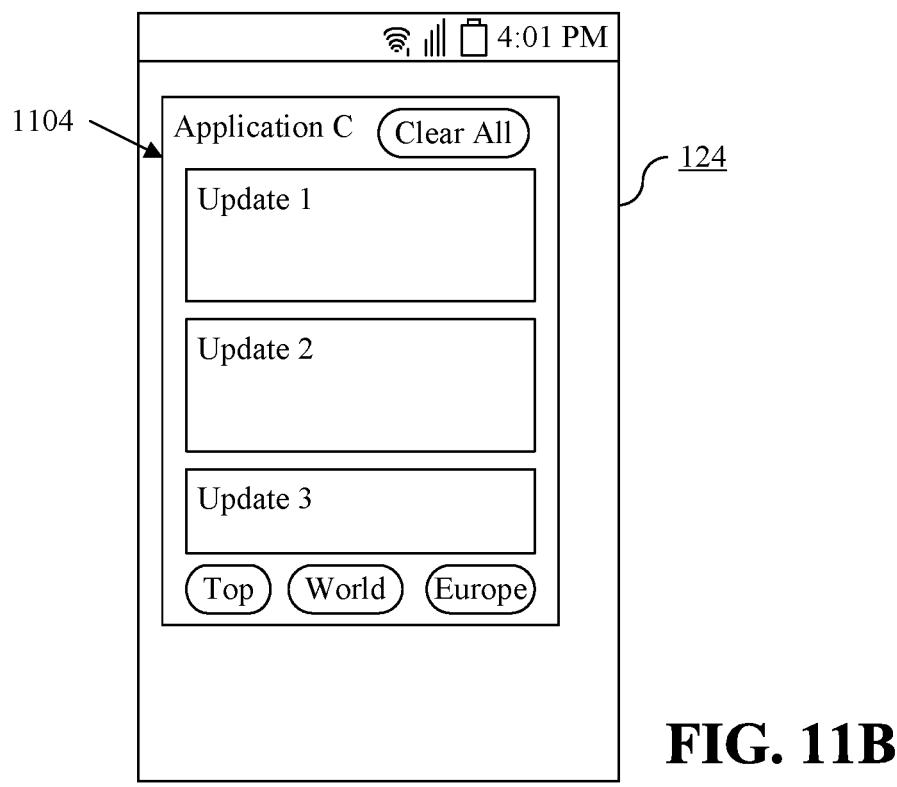

FIGS. 11A and 11B, taken collectively, illustrate an example of an application specific view. Referring to FIG. 11A, display device 124 is displaying an example home screen having icons for applications App A, App B, App C, and App D. For purposes of illustration, the icon of each application that has updates available has a badge indicating the number of updates available for that application. For example, App A has no updates available and no badge; App B has 1 update available as indicated by the badge; App C has 3 updates available as indicated by the badge; and App D has one update available as indicated by the badge. In the example of FIG. 11A, the system detects a user gesture 1102 interacting with the icon for App C. User gesture 1102 may be a touch and hold, a touch and swipe down (as illustrated by the arrow), or another gesture.

Referring to FIG. 11B, display device 124 displays a view 1104. View 1104 is displayed in response to user gesture 1102 of FIG. 11A. In an embodiment, view 1104 is animated to expand out from the icon for App C. In an embodiment, view 1104 is distinct from the plurality of different views described herein that are configured to display updates of a same priority. View 1104 is configured to display the updates that are available for a particular or selected application. As such, the updates displayed in view 1104 for the selected application may be updates of a same priority or distinct (e.g., differing) priorities. In this example, the updates displayed in view 1104 are for application C (App C). For example, view 1104 includes updates only for application C.

Referring back to FIG. 11A, application C had 3 updates available as indicated by the badge. As pictured FIG. 11B, view 1104 displays the 3 available updates for application C. It should be appreciated that a similar style view may be presented for any application for which a user gesture 1102 (e.g., a particular user input) is detected. For example, in response to detecting user gesture 1102 for application B, the system is capable of displaying a view of updates that includes only those updates for application B. In response to detecting user gesture 1102 for application A, the system is capable of informing the user that no updates are available for application A and/or presenting an empty view.

Referring again to view 1104, the system is capable of receiving further user inputs and/or interactions with different ones of the updates displayed. For example, the system is capable of receiving a user selection of update 1 so that the user may dismiss update 1 or access content represented by update 1. In an embodiment, the system may remove view 1104 or dismiss view 1104 in response to a particular user input such as a detected touch outside the bounds of view 1104. In an embodiment, the system is capable of updating the numeric indicators on or proximate to application icons (e.g., badges in FIG. 11A) in response to detected user interactions with updates in view 1104. For example, as update 1 is accessed or dismissed, the badge corresponding to application C is updated to indicate that only 2 updates available. View 1104 provides the user with quick access to all of the updates for a particular application.

Figure 12:
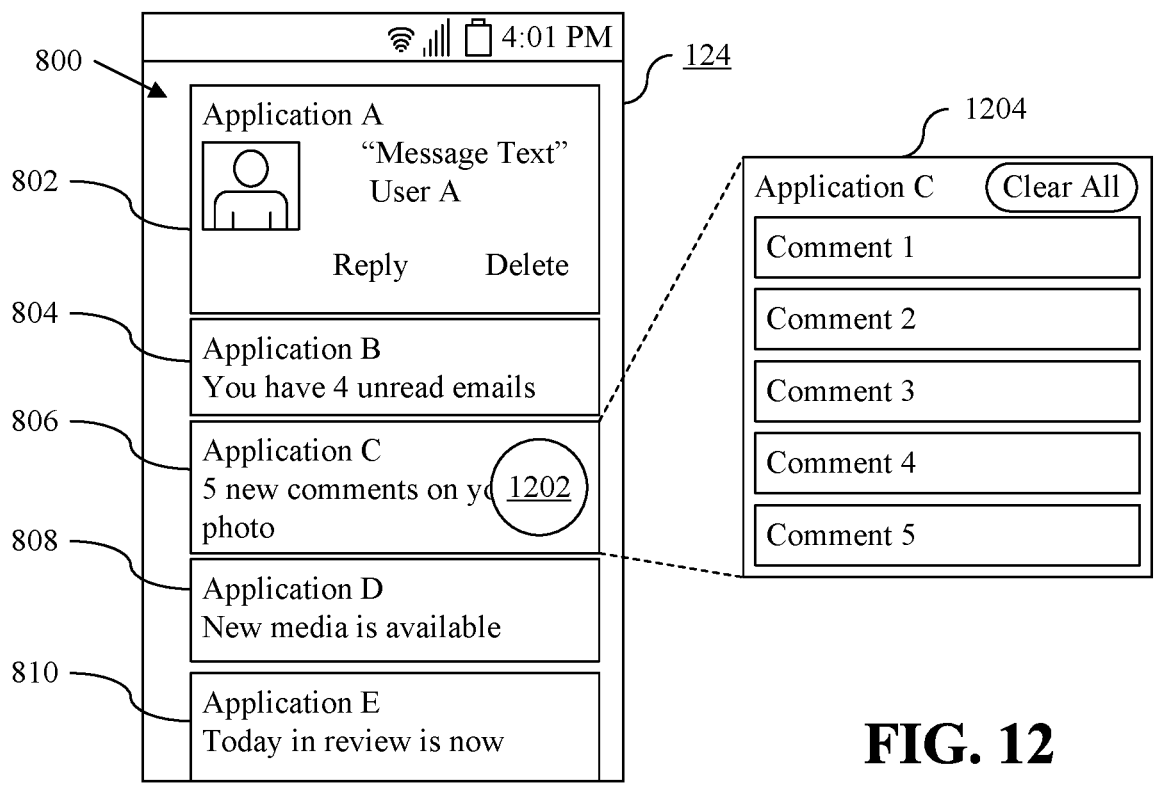
FIG. 12 illustrates another example of a view configured to present updates.

FIG. 12 illustrates another example of a view 800 configured to present updates. FIG. 12 illustrates an example of how a user may navigate updates within a particular view. View 800 presents a linear, scrollable list of updates 802, 804, 806, 808, and 810. A user is able to scroll up and down through the list and interact with individual updates to access the update, dismiss the update, and/or obtain further details about the update.

In the example of FIG. 12, the system detects a user gesture 1202 interacting with detected on update 806 for application C. Update 806 provides a summary of a plurality of updates for application C and indicates that 5 new comments (e.g., updates) have been received on a photo posted on a particular social networking platform. In response to detecting user gesture 1202, the system displays view 1204. In an aspect, while view 1204 is displayed to the right of view 800 in FIG. 12, view 1204 may be displayed over or on top of view 800. For example, view 1204 may be displayed as an overlay above view 800. View 1204 includes a list of the 5 updates (e.g., comments in this case) referenced in the summary shown in update 806. From view 1204, a user may dismiss, access, or obtain further information relating to any one of comments 1-5.

In an embodiment, as a user scrolls beyond the bounds of a particular application's updates, the system may transition to displaying updates for another, different application within the same view. For example, as a user scrolls beyond comment 5 of view 1204 in FIG. 12, the system is capable of displaying updates for application D or a next update presented in view 800. Scrolling up beyond comment 1 may cause the system to display updates for application B in view 1204.

Figure 13:
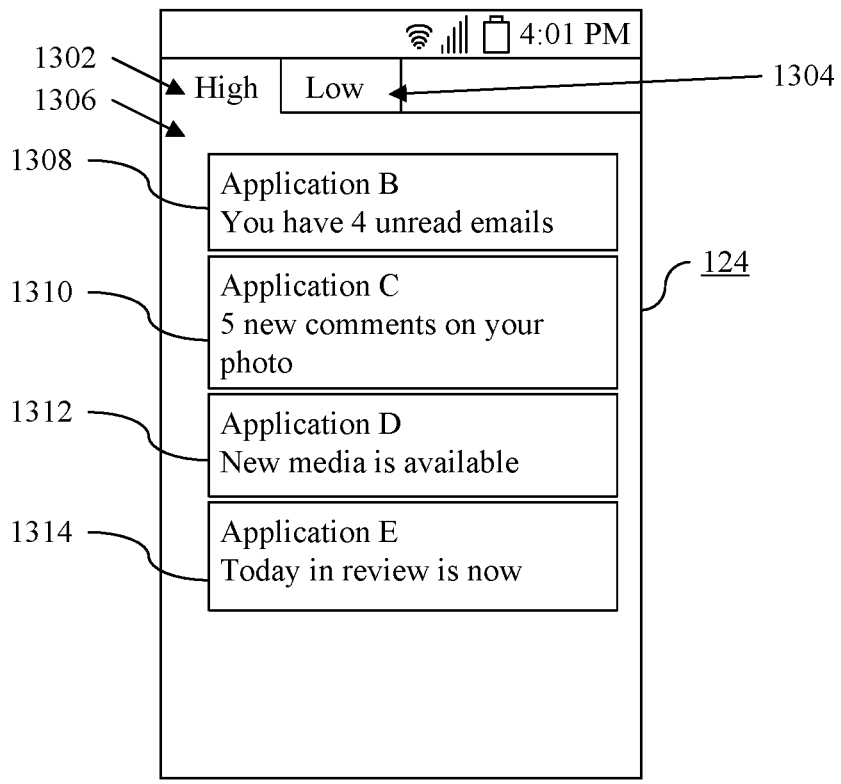
FIG. 13 illustrates another example of a view configured to present updates.

FIG. 13 illustrates another example of a view 1306 configured to present updates. View 1306 is displayed on display device 124. FIG. 13 illustrates an example of a tabbed interface where each different view corresponds to a different tab. For purposes of illustration, a tab 1302 for high priority updates is shown and a tab 1304 for low priority updates is shown. Tab 1302 is selected to show view 1306. View 1306 includes updates 1308, 1310, 1312, and 1314. In the example of FIG. 13, each of updates 1308-1314 has a "high" priority. In response to a user selection of tab 1304, the system is capable of displaying a different view such as a view configured to display low priority updates.

In another embodiment, tabs are correlated with applications. In that case, each tab is associated with one application. The view presented in response to selection of a tab includes only updates for the associated application. For example, if tab 1302 is associated with application A, tab 1302 would display "application A" instead of "high." Accordingly, view 1306 would display only updates for application A. The updates within view 1306 may or may not have differing priorities. Tab 1304 would display the name of another application such as "application B." The view presented in response to selecting tab 1304 would include only updates for application B whether or not the updates were of different priorities.

In one or more embodiments, an update presented in a view that is configured to display updates for different applications may present a summary view of the updates in a single block or tile. Updates 804, 806, 1308, 1310 are examples of summary style updates. In the case of a summary type of update, in response to a selection of the update, the system is capable of displaying the updates for the source application as illustrated in FIG. 12 using view 1204. Such a feature may be implemented from within a tabbed view such as view 1306 as pictured in FIG. 13.

Figure 14:
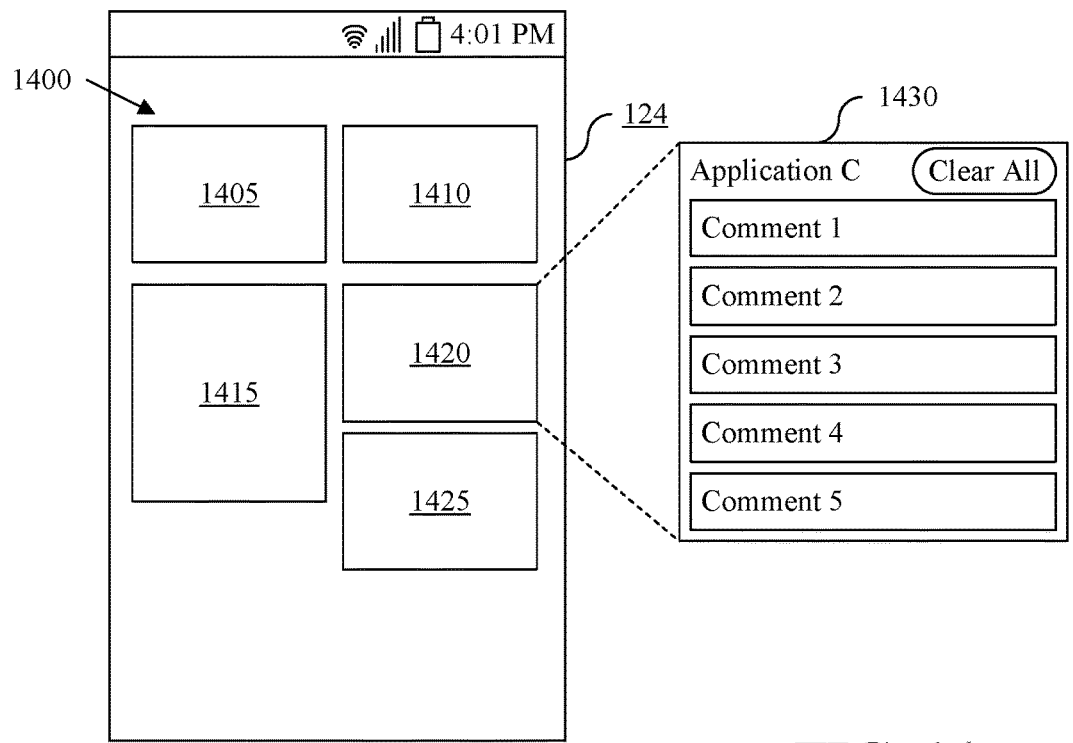
FIG. 14 illustrates another example of a view configured to present updates.

FIG. 14 illustrates another example of a view 1400 configured to present updates. FIG. 14 illustrates an example where view 1400 displays updates as tiles 1405, 1410, 1415, 1420, and 1425. In an aspect, tiles 1405-1425 are arranged in a grid. The tiles may or may not be sized the same. In an aspect, each of tiles 1405-1425 corresponds to one update. In another aspect, one or more or all of the tiles are configured to summarize multiple updates. In the example of FIG. 14, tile 1420 summarizes multiple updates. In response to a selection of tile 1420, view 1430 is displayed. View 1430 displays a list of the updates summarized in tile 1420. As pictured, the summarized updates are broken out into 5 different comments, where each comment is considered an update.

View 1430, while pictured to the right of view 1400 may be displayed over or on top of view 1400. For example, view 1430 may be displayed as an overlay above view 1400. The system may discontinue display of view 1430 in response to a user selection or touch outside of the bounds of view 1430. As pictured, view 1430 further includes a "Clear All" control. Selection of the clear all control clears or dismisses all updates in view 1430 and further dismisses view 1430 so that view 1400 is again displayed.

Though not illustrated, tiles such as tiles 1405-1425 are capable of including shortcuts for actions as described with reference to update 802. The shortcuts may be selected or initiated directly from the update. For example, reply buttons, like controls, etc. may be displayed within a tile allowing the user to interact with the update. In an embodiment, users may select an individual update to open the relevant application and view the new content corresponding to that update.

In an embodiment, the system is capable of displaying updates in different views in different ways. In an example, the system is capable of showing more details for updates in a high priority view than for updates in a low priority view. The additional details may be helpful and/or instructive to the user as to how to handle the high priority update. In another example, the system is capable of displaying an icon or other identifying information for the source application on updates in a view that contains updates from multiple applications. As such, users are able to determine the source application for the updates. For views that include only updates from one or a same application, each individual update need not include such an icon or other identifier of the source application.

In an embodiment, the layout of a view that is displayed is selected by the originating application. For example, the originating application may select a layout (e.g., list or tiles) from a library of predetermined layouts provided by the update manager for displaying updates. In another example, the originating application may provide a custom layout for displaying updates. In still another example, an originating application may select a layout to be used for different priority updates. For example, an originating application may specify a first layout for high priority updates and a second and different layout for low priority updates.

Figure 15:
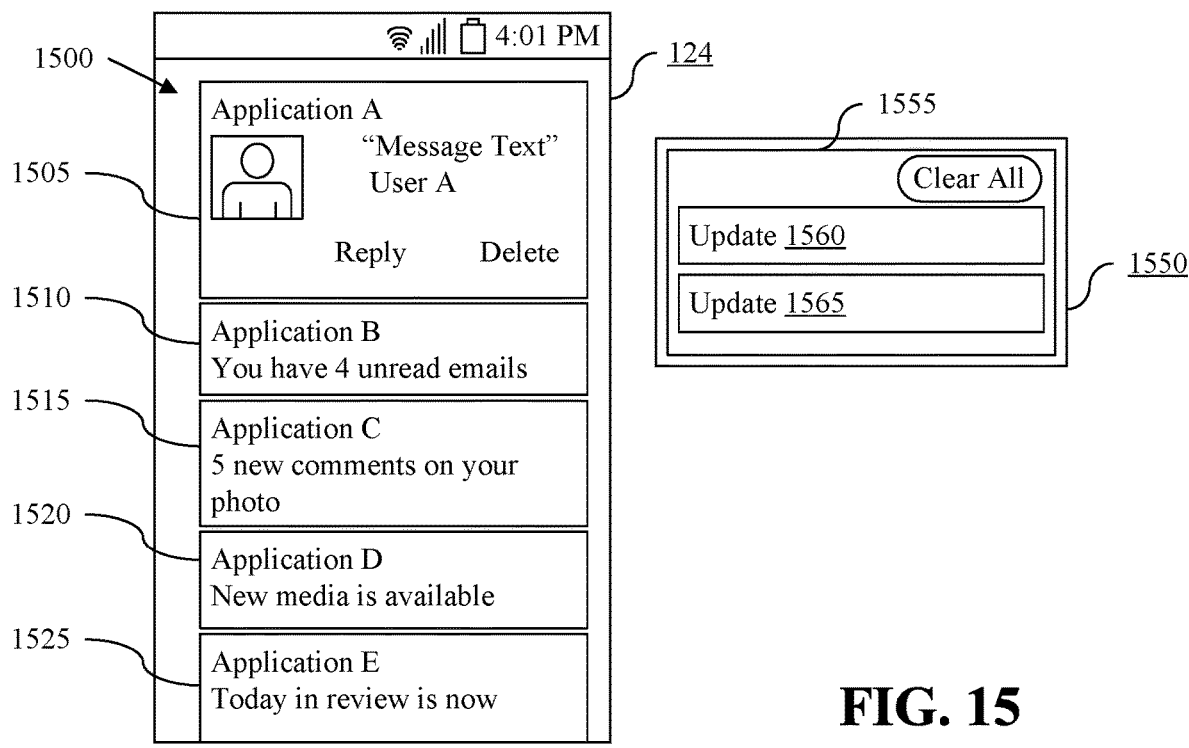
FIG. 15 illustrates example views on multiple devices.

FIG. 15 illustrates example views on multiple devices. As pictured, a view 1500 including multiple updates such as updates 1505, 1510, 1515, 1520, 1525, and 1530 is displayed on display device 124 for system 100. An additional device 1550 is shown. For example, device 1550 may be a smart watch, a fitness tracking device, or another computing device also having a display device (e.g., a screen) capable of displaying view 1555. View 1555 displays updates 1560 and 1565. In one aspect, device 1550 is communicatively linked with system 100. In another aspect, device 1550 is not in direct communication with system 100. For example, device 1550 may operate independently and use different criteria than system 100.

In an embodiment, view 1500 is configured to display updates having a first priority, while view 1555 is configured to display updates having a second and different priority. As an illustrative example, view 1555 is configured to display high priority updates and is displayed on a wearable device for easy access by a user. View 1500 is configured to display low priority updates on system 100. Thus, each of views 1500 and 1555 is designated for display on a different device. In another embodiment, the views may display updates according to source application, e.g., where view 1500 includes updates for a first application and view 1555 includes updates for a second and different application.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to display or other peripheral output device, sending or transmitting to another system, exporting, or the like.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of managing updates, comprising:
receiving a plurality of data items indicating available content for different applications and specifying available actions for interacting with the available content;
determining, using a processor of a device, that a selected data item of the plurality of data items qualifies for multiple update processing based, at least in part, on determining that the application corresponding to the selected data item is a user specified application selected for multiple update processing;
in response to determining that the selected data item qualifies for multiple update processing, determining, using an update manager, a first priority for the selected data item and a second priority for the selected data item, wherein the second priority is lower than the first priority;
creating, using the update manager, a plurality of updates for the selected data item by creating a first update for the selected data item having the first priority and creating a second update for the selected data item having the second priority, wherein the first update and the second update exist concurrently in the device;
displaying, on a display device coupled to the processor, the first update and the second update in a first view and a second view, respectively based on the priorities assigned by the update manager upon creation, wherein each view is configured to display only updates of a same priority and each view is displayed by the device one at a time in response to a different user input;
in response to receiving a further user input, determining whether the further user input accesses content referenced by the first update or the second update, dismisses the first update, or dismisses the second update; and in response to determining that the further user input dismisses the first update, dismissing the first update and clearing the first update from the first view and from the device while the second update is retained.

2. The method of claim 1, wherein the first priority is determined using a first priority determination technique and the second priority is determined using a second priority determination technique that is different from the first priority determination technique.

3. The method of claim 2, wherein the first priority determination technique includes determining the first priority based on a source application and the second priority determination technique includes determining the second priority based on a semantic analysis of content of the selected data item.

4. The method of claim 1, further comprising, prior to receiving the further user input:
responsive to a first user input, displaying, on the display device, the first view, wherein the first view includes only a first plurality of updates that have the first priority, wherein the first plurality of updates includes the first update; and
responsive to a second and subsequent user input, displaying on the display device the second view including only a second plurality of updates that have the second priority, wherein the second plurality of updates includes the second update, and wherein each of the first and second views is displayed by the device one at a time in response to the first and second user inputs.

5. The method of claim 1, wherein the displaying the updates comprises:
in response to detecting a user interaction with an icon representing a first application of the different applications, displaying a combined view configured to display updates of a plurality of different priorities only for the first application, wherein the combined view is distinct from the first and second views, the icon indicates at least one update being available for the application, and the icon is displayed on a home screen displayed by the display device.

6. The method of claim 1, wherein at least one of the first or second views includes a plurality of tabs, wherein each tab corresponds to one of the different applications and includes only updates for the corresponding application.

7. The method of claim 1, wherein the dismissing the first update and clearing the first update from the first view and from the device while the second update is retained is one of a plurality of operations selected based on the further user input, and wherein another one of the plurality of operations selectable based on the further user input includes:
dismissing both the first update and the second update from the device and clearing the first update and the second update from the first view and the second view, respectively, in response to determining that the further user input dismisses the second update or accesses content referenced by the first update or the second update.

8. An apparatus, comprising:
a memory configured to store program code;
a processor coupled to the memory, wherein the processor, in response to executing the program code, is configured to initiate operations for managing updates including:
receiving a plurality of data items indicating available content for different applications and specifying available actions for interacting with the available content;
determining that a selected data item of the plurality of data items qualifies for multiple update processing based, at least in part, on determining that the application corresponding to the selected data item is a user specified application selected for multiple update processing;
in response to determining that the selected data item qualifies for multiple update processing, determining, using an update manager, a first priority for the selected data item and a second priority for the selected data item, wherein the second priority is lower than the first priority;
creating, using the update manager, a plurality of updates for the selected data item by creating a first update for the selected data item having the first priority and creating a second update for the selected data item having the second priority, wherein the first update and the second update exist concurrently in the apparatus;
displaying the first update and the second update in a first view and a second view, respectively on a display device coupled to the processor based on the priorities assigned by the update manager upon creation, wherein each view is configured to display only updates having same priorities and each view is displayed by the apparatus one at a time in response to a different user input;
in response to receiving a further user input, determining whether the further user input accesses content referenced by the first update or the second update, dismisses the first update, or dismisses the second update; and
in response to determining that the further user input dismisses the first update, dismissing the first update and clearing the first update from the first view and from the device while the second update is retained.

9. The apparatus of claim 8, wherein the first priority is determined using a first priority determination technique and the second priority is determined using a second priority determination technique that is different from the first priority determination technique.

10. The apparatus of claim 9, wherein the first priority determination technique includes determining the first priority based on a source application and the second priority determination technique includes determining the second priority based on a semantic analysis of content of the selected data item.

11. The apparatus of claim 8, further comprising, prior to receiving the further user input:
responsive to a first user input, displaying, on the display device, a first view, wherein the first view includes only a first plurality of updates that have the first priority, wherein the first plurality of updates includes the first update; and
responsive to a second and subsequent user input, displaying on the display device a second view including only a second plurality of updates that have the second priority, wherein the second plurality of updates includes the second update, and wherein each of the first and second views is displayed by the device one at a time in response to the first and second user inputs.

12. The apparatus of claim 8, wherein the dismissing the first update and clearing the first update from the first view and from the device while the second update is retained is one of a plurality of operations selected based on the further user input, and wherein another one of the plurality of operations selectable based on the further user input includes:
dismissing both the first update and the second update from the device and clearing the first update and the second update from the first view and the second view, respectively, in response to determining that the further user input dismisses the second update or accesses content referenced by the first update or the second update.

13. A computer program product comprising a computer readable storage medium having program code stored thereon for managing updates, the program code executable by a processor of a device to perform operations comprising:
receiving a plurality of data items specifying available content for different applications and specifying available actions for interacting with the available content;
determining that a selected data item of the plurality of data items qualifies for multiple update processing based, at least in part, on determining that the application corresponding to the selected data item is a user specified application selected for multiple update processing;
in response to determining that the selected data item qualifies for multiple update processing, determining, using an update manager, a first priority for the selected data item and a second priority for the selected data item, wherein the second priority is lower than the first priority;
creating, using the update manager, a plurality of updates for the selected data item by creating a first update for the selected data item having the first priority and creating a second update for the selected data item having the second priority, wherein the first update and the second update exist concurrently in the device;
displaying, on a display device, the first update and the second update in a first view and a second view, respectively based on the priorities assigned by the update manager upon creation, wherein each view is configured to display only updates having same priorities and each view is displayed by the device one at a time in response to a different user input;
in response to receiving a further user input, determining whether the further user input accesses content referenced by the first update or the second update, dismisses the first update, or dismisses the second update; and
in response to determining that the further user input dismisses the first update, dismissing the first update and clearing the first update from the first view and from the device while the second update is retained.

14. The computer program product of claim 13, wherein the first priority is determined using a first priority determination technique and the second priority is determined using a second priority determination technique that is different from the first priority determination technique.

15. The computer program product of claim 14, wherein the first priority determination technique includes determining the first priority based on a source application and the second priority determination technique includes determining the second priority based on a semantic analysis of content of the selected data item.

16. The computer program product of claim 13, further comprising, prior to receiving the further user input:
responsive to a first user input, displaying, on the display device, a first view, wherein the first view includes only a first plurality of updates that have the first priority, wherein the first plurality of updates includes the first update; and
responsive to a second and subsequent user input, displaying on the display device a second view including only a second plurality of updates that have the second priority, wherein the second plurality of updates includes the second update, and wherein each of the first and second views is displayed by the device one at a time in response to the first and second user inputs.

17. The computer program product of claim 13, wherein the dismissing the first update and clearing the first update from the first view and from the device while the second update is retained is one of a plurality of operations selected based on the further user input, and wherein another one of the plurality of operations selectable based on the further user input includes:
dismissing both the first update and the second update from the device and clearing the first update and the second update from the first view and the second view, respectively, in response to determining that the further user input dismisses the second update or accesses content referenced by the first update or the second update.

18. The method of claim 2, wherein:
the first priority determination technique includes determining the first priority based on a source application or a type of content corresponding to the selected data item; and
the second priority determination technique includes determining the second priority based on historical response time of a user interacting with prior same updates or frequency of use of the application corresponding to the selected data item.

19. The apparatus of claim 9, wherein:
the first priority determination technique includes determining the first priority based on a source application or a type of content corresponding to the selected data item; and
the second priority determination technique includes determining the second priority based on historical response time of a user interacting with prior same updates or frequency of use of the application corresponding to the selected data item.

20. The computer program product of claim 14, wherein:
the first priority determination technique includes determining the first priority based on a source application or a type of content corresponding to the selected data item; and
the second priority determination technique includes determining the second priority based on historical response time of a user interacting with prior same updates or frequency of use of the application corresponding to the selected data item.

* * * * *